(12) United States Patent    (10) Patent No.: US 8,167,351 B2
Plowman    (45) Date of Patent: May 1, 2012

(54) SEAT/FLATBED/DROP-IN-CONTAINER ASSEMBLY FOR CART

(76) Inventor: Donald J. Plowman, Vassar, MI (US)

( * ) Notice: Subject to any disclaimer, the term of this patent is extended or adjusted under 35 U.S.C. 154(b) by 219 days.

(21) Appl. No.: 12/652,766

(22) Filed: Jan. 6, 2010

(65) Prior Publication Data

US 2011/0163567 A1    Jul. 7, 2011

(51) Int. Cl.
*B60N 2/32*    (2006.01)
(52) U.S. Cl. .......................................................... 296/69
(58) Field of Classification Search ............ 296/69, 296/37.1; 220/23.86
See application file for complete search history.

(56) References Cited

U.S. PATENT DOCUMENTS

| | | | | |
|---|---|---|---|---|
| 4,125,284 | A * | 11/1978 | Hicks et al. | 296/62 |
| 4,946,193 | A * | 8/1990 | Oka | 280/769 |
| 5,429,290 | A * | 7/1995 | Greene, Jr. | 224/274 |
| 6,237,981 | B1 * | 5/2001 | Selleck | 296/66 |
| 7,980,628 | B2 * | 7/2011 | Hu et al. | 297/188.1 |
| 2004/0031639 | A1 * | 2/2004 | Deves et al. | 180/311 |
| 2005/0284867 | A1 * | 12/2005 | Sander et al. | 220/23.86 |
| 2008/0211270 | A1 * | 9/2008 | Hu et al. | 297/188.08 |
| 2008/0284119 | A1 * | 11/2008 | Williamson | 280/30 |
| 2010/0225082 | A1 * | 9/2010 | Krosschell et al. | 280/124.1 |
| 2011/0198879 | A1 * | 8/2011 | Kemp et al. | 296/66 |

OTHER PUBLICATIONS http://wayback.archive.org/web/20080615000000*/http://affordablegolfcartrentals.com/cargo-caddie.html showing The Portable Cargo Caddie website of May 19, 2008—printed out Nov. 14, 2011.*
Affordable Golf Cart Rental [North Myrtle Beach, SC 29582 (843-385-2547)]—"The Portable Cargo Caddie The World's Ultimate Light Utility Carry-All"—http://affordablegolfcartrentals.com/cargo-caddie.html—Oct. 28, 2011 (apparently disclosed in U.S. Appl. No. 60/983,084).

* cited by examiner

*Primary Examiner* — H Gutman
(74) *Attorney, Agent, or Firm* — Bliss McGlynn, P.C.

(57) ABSTRACT

A seat/flatbed/drop-in-container assembly for a cart comprises a framework extending from and supported by the cart, including at least one support member, and defining a volume of space interiorly of the support member and a remaining portion of the framework. A seat is supported by the framework within the volume of space and adapted to extend to define a flatbed supported by the framework within the volume of space. A container is adapted to be dropped in the volume of space and supported upon the flatbed. To secure the container to the framework upon the flatbed, the support member extends through an aperture disposed completely through the container and/or is interferingly fitted between a body of the container and lip of a rim thereof. Alternatively, to secure the container upon the flatbed, the seat includes a seat back, and the container defines a flange that holds the seat back.

20 Claims, 7 Drawing Sheets

SEAT/FLATBED/DROP-IN-CONTAINER ASSEMBLY FOR CART

BACKGROUND OF INVENTION

1. Field of Invention

The invention relates, generally, to a cart and, more particularly, to an assembly for providing a seat, flatbed, or drop-in container to the cart.

2. Description of Related Art

It is known to convert or customize a cart—especially a motorized cart, such as a typical golf cart (or car)—by adding accessories and/or fixtures to the golf cart (and/or removing or modifying existing structure of the golf cart). In this way, the golf cart can be used in more ways and settings than those in which the golf cart was originally intended to be used, i.e, to carry and transport a couple of golfers and their respective bags of golf clubs and other golf-related paraphernalia around a golf course.

More specifically, it is desirable to carry and transport people within and around airports, beaches, entertainment-related venues, and work sites, just to name a few places. To this end, it is known to add a seat, particularly a bench-style seat, to a golf cart such that the golf cart can carry and transport more passengers [other than the driver and front-seat passenger (or even two front-seat passengers)]. Furthermore, it is desirable to carry and transport, say, an athlete who is injured during an athletic competition and who, as a result of such injury, must remain supine for an extended period of time. To this end, it is known to add a flatbed to a golf cart such that the golf cart can carry and transport such an athlete from the site of the injury (e.g., on a field where the competition is played) to a place where the athlete can receive proper medical attention (e.g., a locker room). No doubt such a flatbed can also be used to carry and transport cargo, such as tools, that otherwise would not fit into a cargo-carrying compartment of the golf cart before the golf cart was converted or customized. In addition, it is desirable to carry and transport cargo via a motor vehicle within a community that has a generally low volume of heavy traffic while conserving fuel of the vehicle. This is especially true in a community in which, for instance, a grocery store is located a relatively short distance from a neighborhood. To this end, it is known to use a golf cart as a primary means of transportation and add a container to the golf cart such that the golf cart can carry and transport groceries from the store.

Of course, those having ordinary skill in the related art should appreciate that ways and settings in which a golf cart can be used are not limited to those just exemplified. In any event, a golf cart can be converted or customized by adding a seat, flatbed, or container to the golf cart such that the golf cart carries and transports more people and cargo than the golf cart otherwise would do so. Nevertheless, a single aftermarket assembly that adds a seat, flatbed, and container to a golf cart such that the golf cart satisfactorily so carries and transports more people and cargo is not known in the related art.

For example, in the known related art, the container is not satisfactorily secured to the golf cart. In particular, the container is only hemmed-in by a combination of the rear of a front seat of the golf cart and a set of, say, rails, wherein each of the front seat and rails merely butts-up against a respective side of the container. Consequently, the container can operatively move, especially upward, with respect to the surface upon which the container is supported. To keep the container from being displaced from the golf cart if the container were to move upward from such surface during operation of the golf cart, the top of the rails of the assembly of the known related art are positioned substantially high above the plane defined by the opening into the container. However, as a result of such positioning, much (if not most or even all) of that part or those parts of the cargo that is/are positioned above the container is/are essentially boxed-in by the front seat and rails. In this way, the shape and size of much (if not most or even all) of the cargo that the assembly of the known related art can carry and transport is substantially limited to the shape and size that fits in the collective volume of the interior of the container and space defined interior of the front seat and rails.

Thus, there is a need in the related art for a single aftermarket assembly that adds a seat, flatbed, and container to a golf cart such that the golf cart satisfactorily carries and transports more people and cargo than the golf cart otherwise would do so. There is a need in the related art for such an assembly also the container of which is satisfactorily secured to the golf cart. There is a need in the related art for such an assembly also the container of which is not allowed to operatively move in any direction. There is a need in the related art for such an assembly also the shape and size of cargo that it can carry and transport in the container is not substantially limited. There is a need in the related art for such an assembly also that can be specifically designed to be employed with a particular type of golf cart. There is a need in the related art also for a drop-in container that can be used with a seat kit—such as a two-in-one fold-down (a seat folded down into a flatbed)—for a particular type of golf cart.

SUMMARY OF INVENTION

The invention overcomes the disadvantages in the related art in a seat/flatbed/drop-in-container assembly for a cart. The assembly comprises a framework that extends from and is supported by the cart, includes at least one support member, and defines a volume of space interiorly of the support member and a remaining portion of the framework. A seat is supported by the framework within the volume of space and adapted to extend to define a flatbed supported by the framework within the volume of space. A container is adapted to be dropped in the volume of space and supported upon the flatbed. To secure the container to the framework upon the flatbed, the container defines an aperture disposed completely through the container, and the support member extends through the aperture. In addition or alternatively, to secure the container to the framework upon the flatbed, the container defines a body and rim of the container, the rim defines a lip of the rim, and the support member is interferingly fitted between the body and lip. Alternatively, to secure the container upon the flatbed, the seat includes a seat back, and the container defines a flange that holds the seat back. The invention overcomes the disadvantages in the related art also in a cart comprising the assembly.

One advantage of the seat/flatbed/drop-in-container assembly for a cart of the invention is that it is an aftermarket assembly that adds a seat, flatbed, and container to the cart such that the cart satisfactorily carries and transports more people and cargo than the cart otherwise would do so.

Another advantage of the seat/flatbed/drop-in-container assembly for a cart of the invention is that the container of the assembly is satisfactorily secured to the cart.

Another advantage of the seat/flatbed/drop-in-container assembly for a cart of the invention is that the container of the assembly is substantially not allowed to operatively move in any direction.

Another advantage of the seat/flatbed/drop-in-container assembly for a cart of the invention is that it does not substantially limit the shape and size of cargo that it can carry and transport in the container of the assembly.

Another advantage of the seat/flatbed/drop-in-container assembly for a cart of the invention is that it can be specifically designed to be employed with a particular type of cart.

Another advantage of the seat/flatbed/drop-in-container assembly for a cart of the invention is that it provides a drop-in container that can be used with a seat kit—such as a two-in-one fold-down (a seat folded down into a flatbed)—for a particular type of golf cart.

Another advantage of the seat/flatbed/drop-in-container assembly for a cart of the invention is that it allows for relatively easy and quick transition between the seat and flatbed and between the flatbed and container.

Another advantage of the seat/flatbed/drop-in-container assembly for a cart of the invention is that installation of the assembly upon the cart requires no or minimal removal or modification of structure of the cart.

Another advantage of the seat/flatbed/drop-in-container assembly for a cart of the invention is that it can be installed upon the cart relatively easily and quickly.

Other objects, features, and advantages of the seat/flatbed/drop-in-container assembly for a cart of the invention will be readily appreciated as the assembly becomes more understood while the subsequent detailed description of an embodiment of the assembly is read taken in conjunction with the accompanying drawing of such embodiment.

BRIEF DESCRIPTION OF EACH FIGURE OF DRAWING

DETAILED DESCRIPTION OF EMBODIMENT OF INVENTION

A seat/flatbed/drop-in-container assembly for a cart according to the invention is generally indicated at 10 in FIGS. 1 through 7, where like numerals are used to designate like structure throughout the embodiment of the assembly 10 disclosed herein. Although the assembly 10 is described and shown herein employed with a typical golf cart, generally indicated at 12, those having ordinary skill in the related art should appreciate that the assembly 10 can be employed with any suitable vehicle, in general, and cart, in particular.

Figure 1:
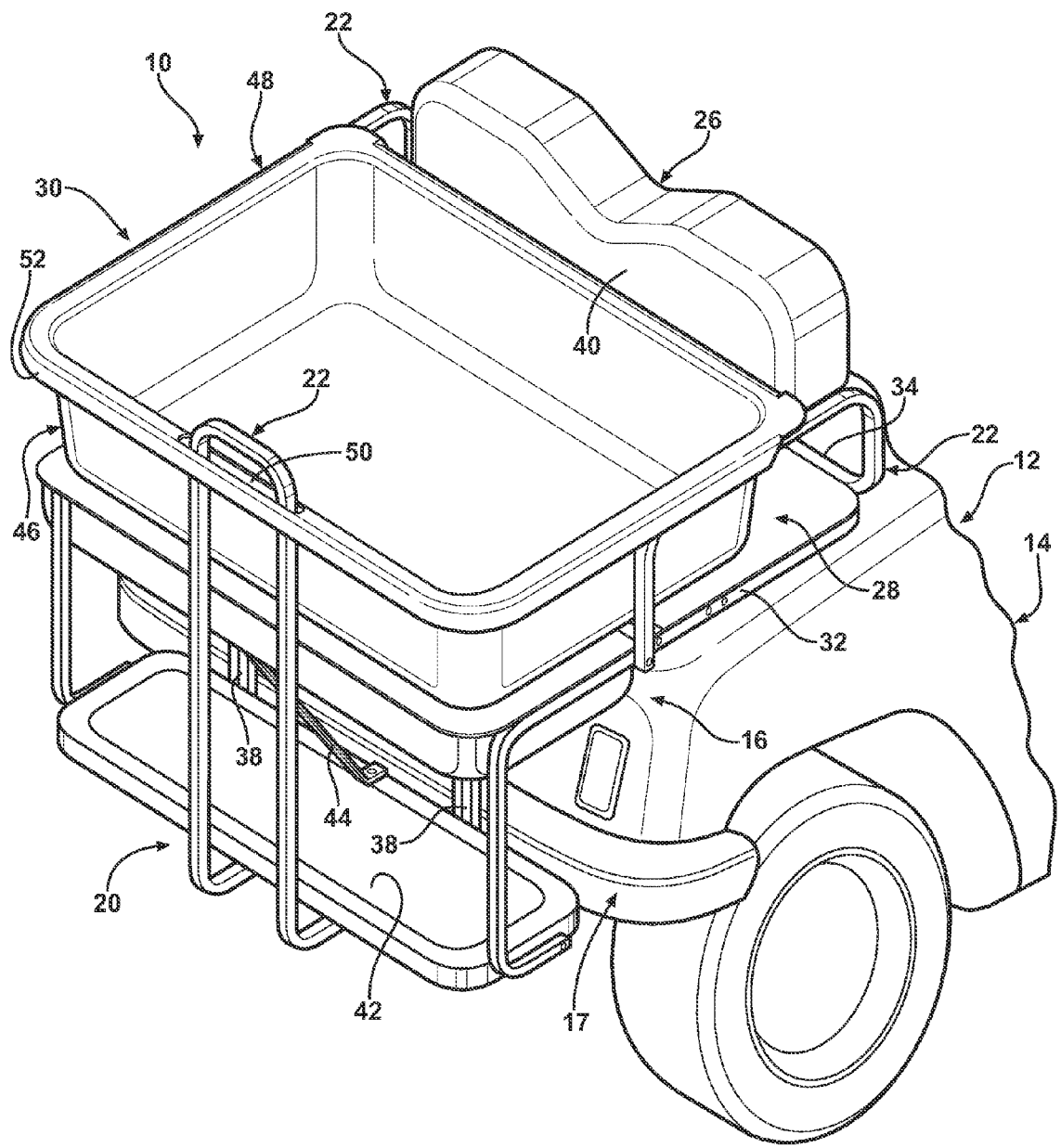
FIG. 1 is an environmental view of the seat/flatbed/drop-in-container assembly for a cart of the invention showing the assembly employed with a rear portion of a typical golf cart.
Figure 2:
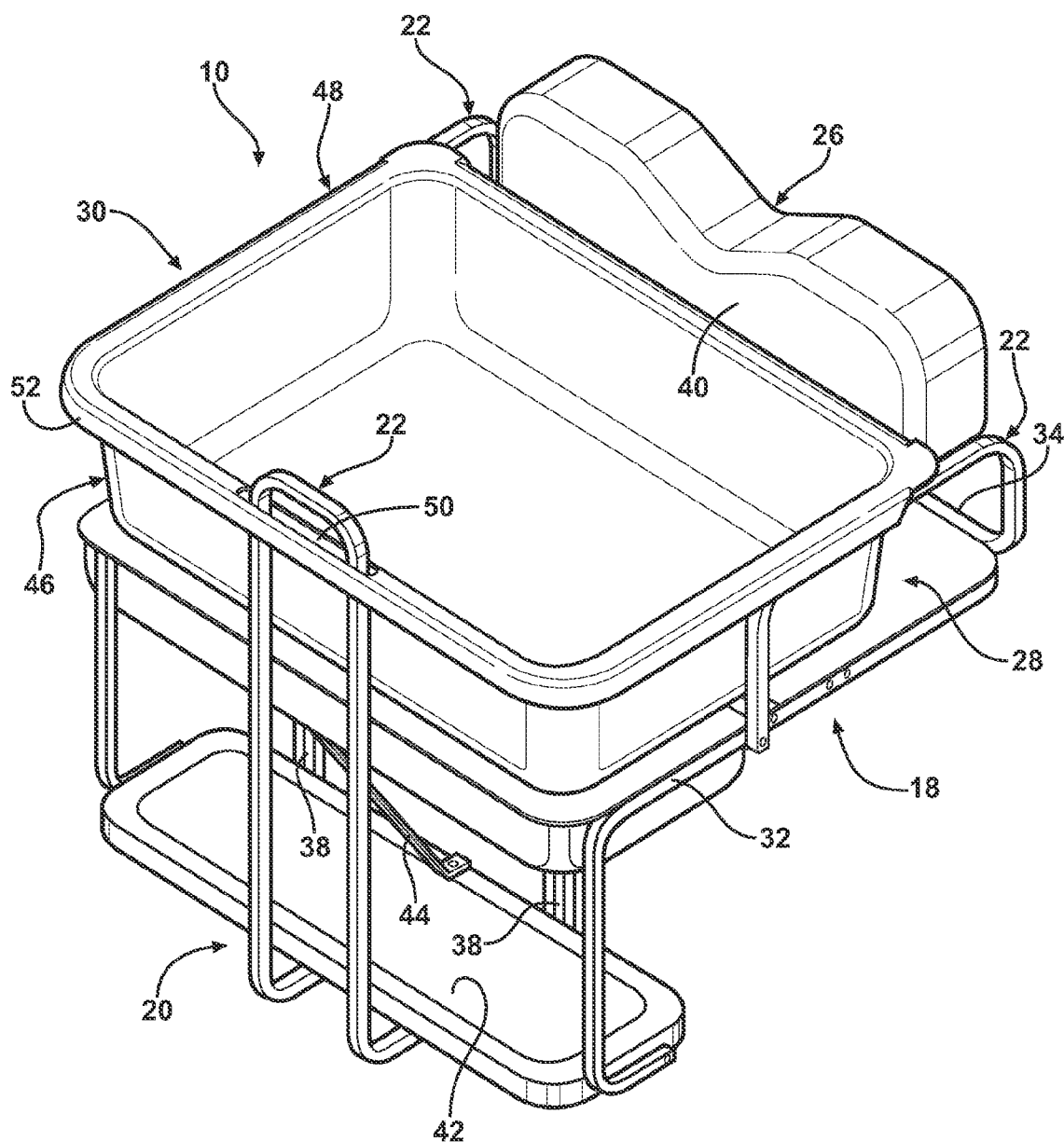
FIG. 2 is a perspective view of the seat/flatbed/drop-in-container assembly for a cart of the invention showing the container supported upon the flatbed and support members positively engaging the container to secure the container to the framework upon the flatbed.
Figure 3:
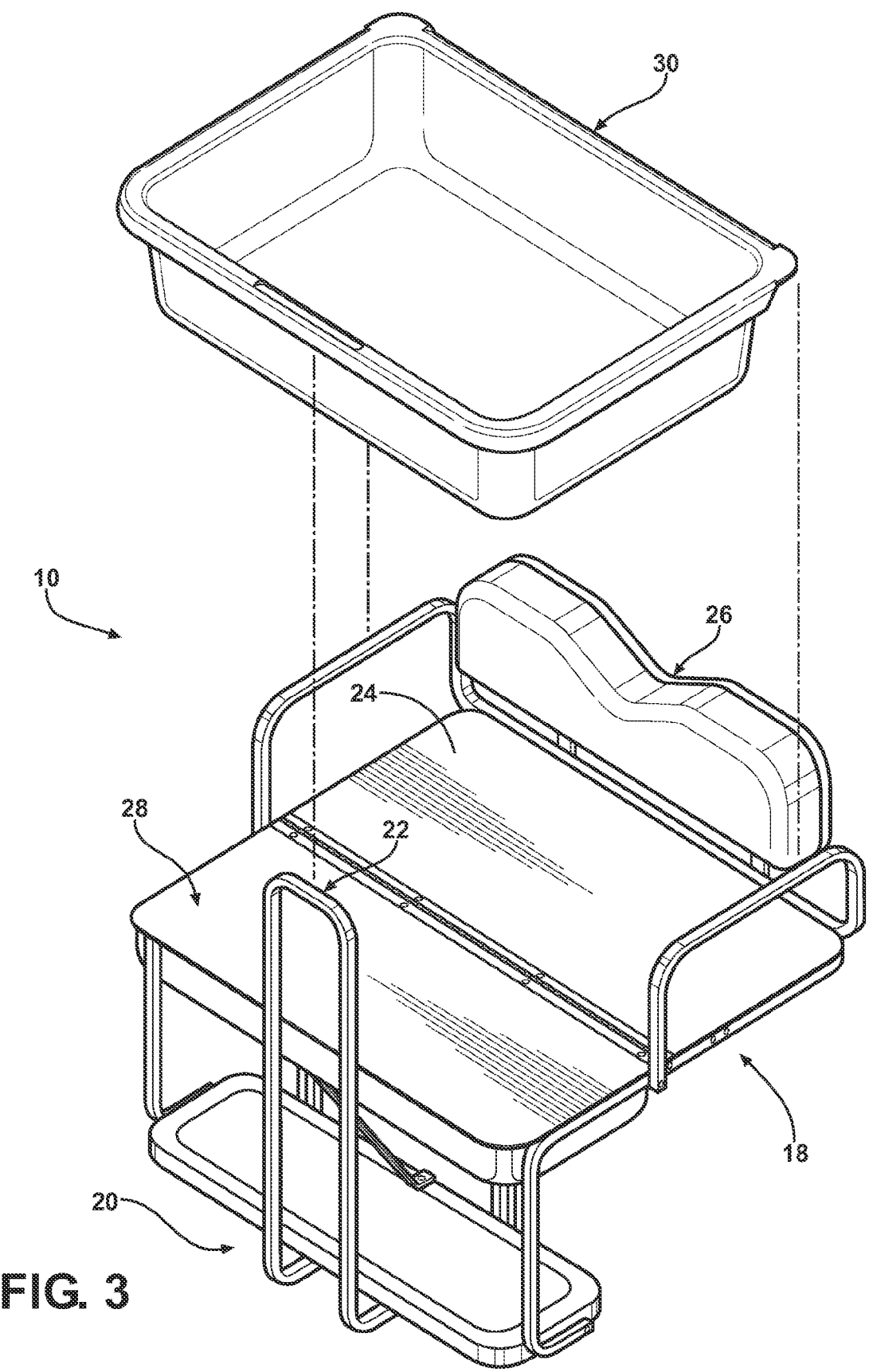
FIG. 3 is an assembly view of the seat/flatbed/drop-in-container assembly for a cart of the invention showing the container to be dropped in the volume of space and supported upon the flatbed.
Figure 4:
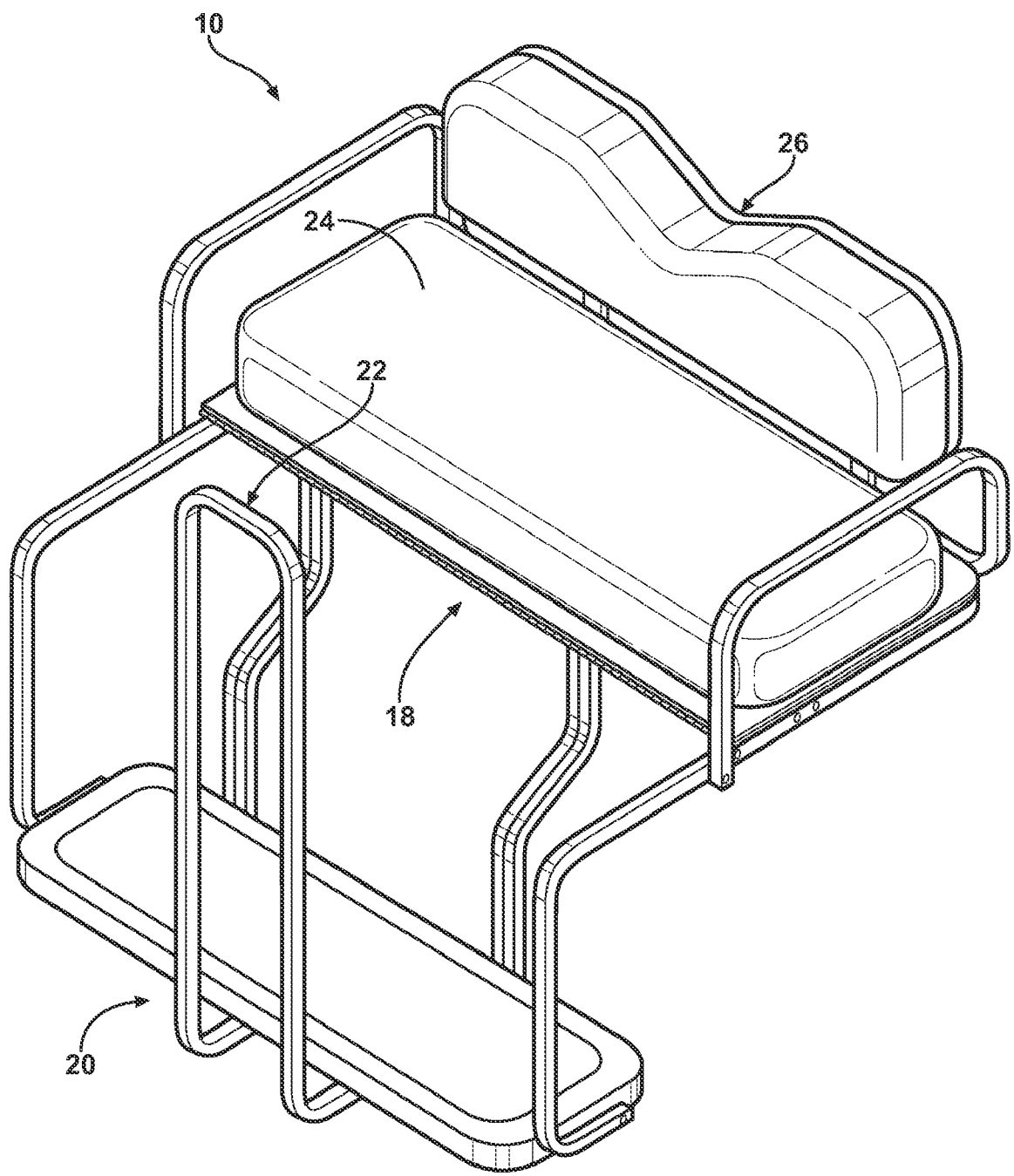
FIG. 4 is a perspective view of the seat/flatbed/drop-in-container assembly for a cart of the invention showing the seat supported by the framework within the volume of space.
Figure 5:
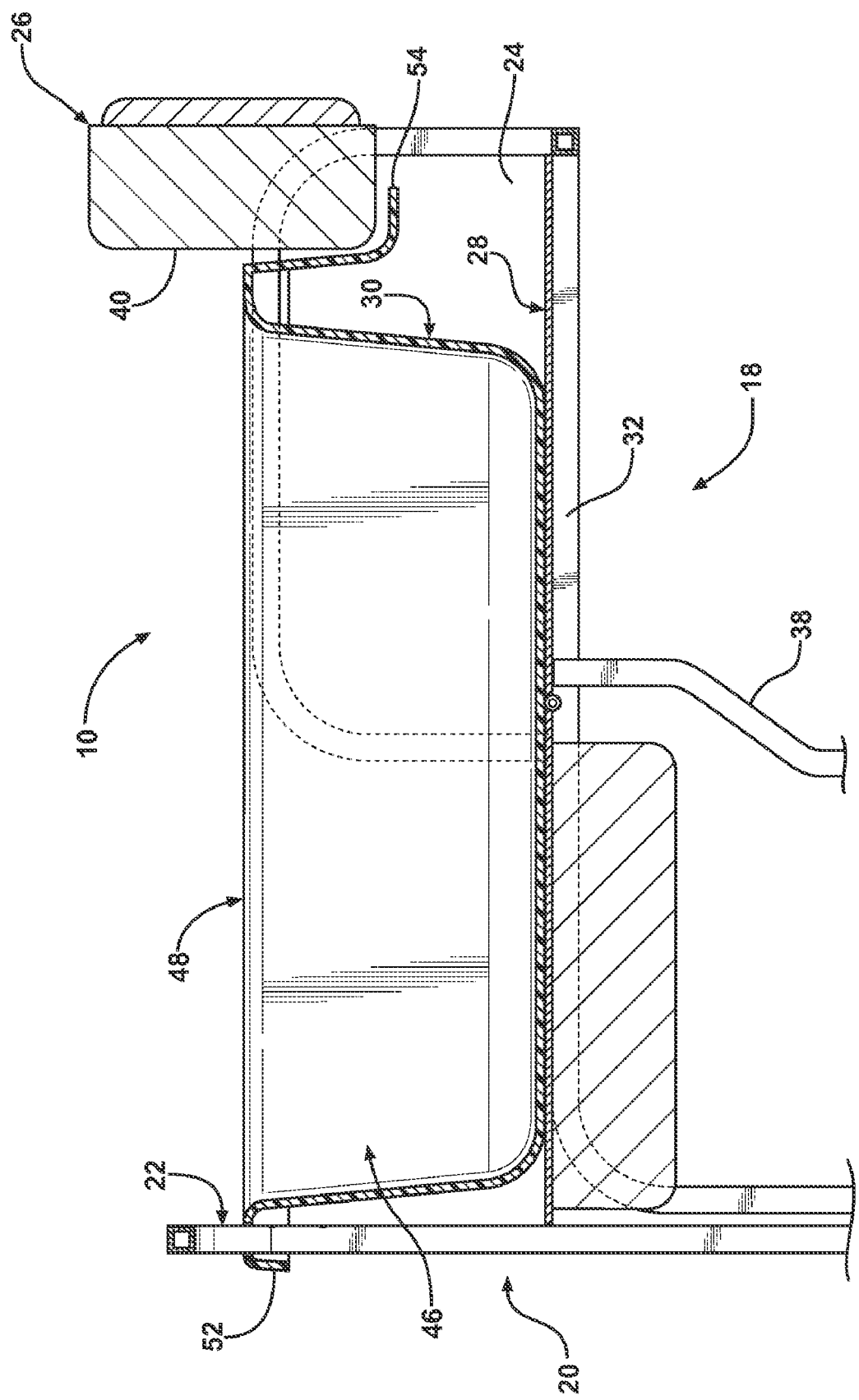
FIG. 5 is a sectional side view of the seat/flatbed/drop-in-container assembly for a cart of the invention showing the container supported upon the flatbed and a support member positively engaging the container to secure the container to the framework upon the flatbed.
Figure 6:
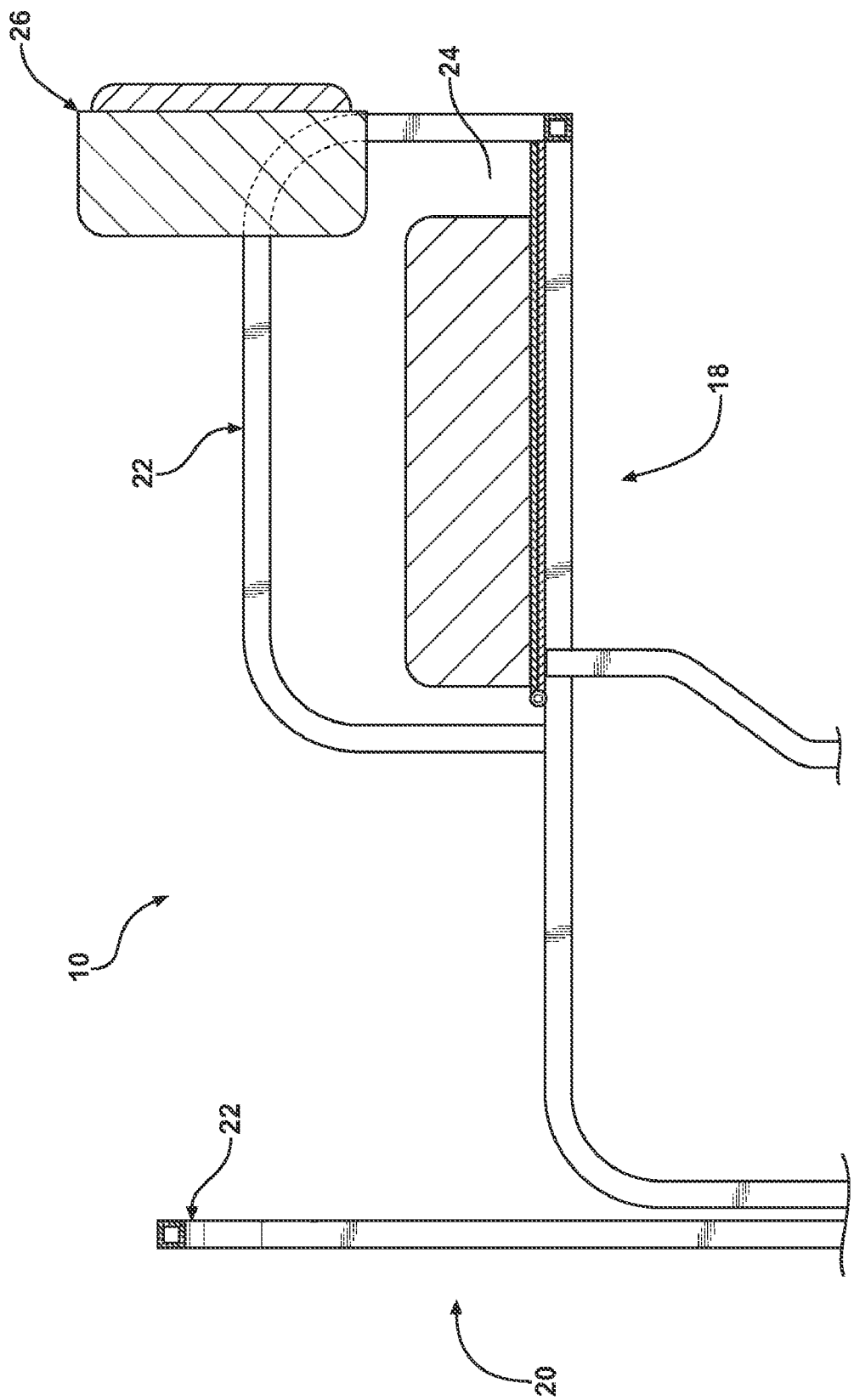
FIG. 6 is a sectional side view of the seat/flatbed/drop-in-container assembly for a cart of the invention showing the seat supported by the framework within the volume of space.
Figure 7:
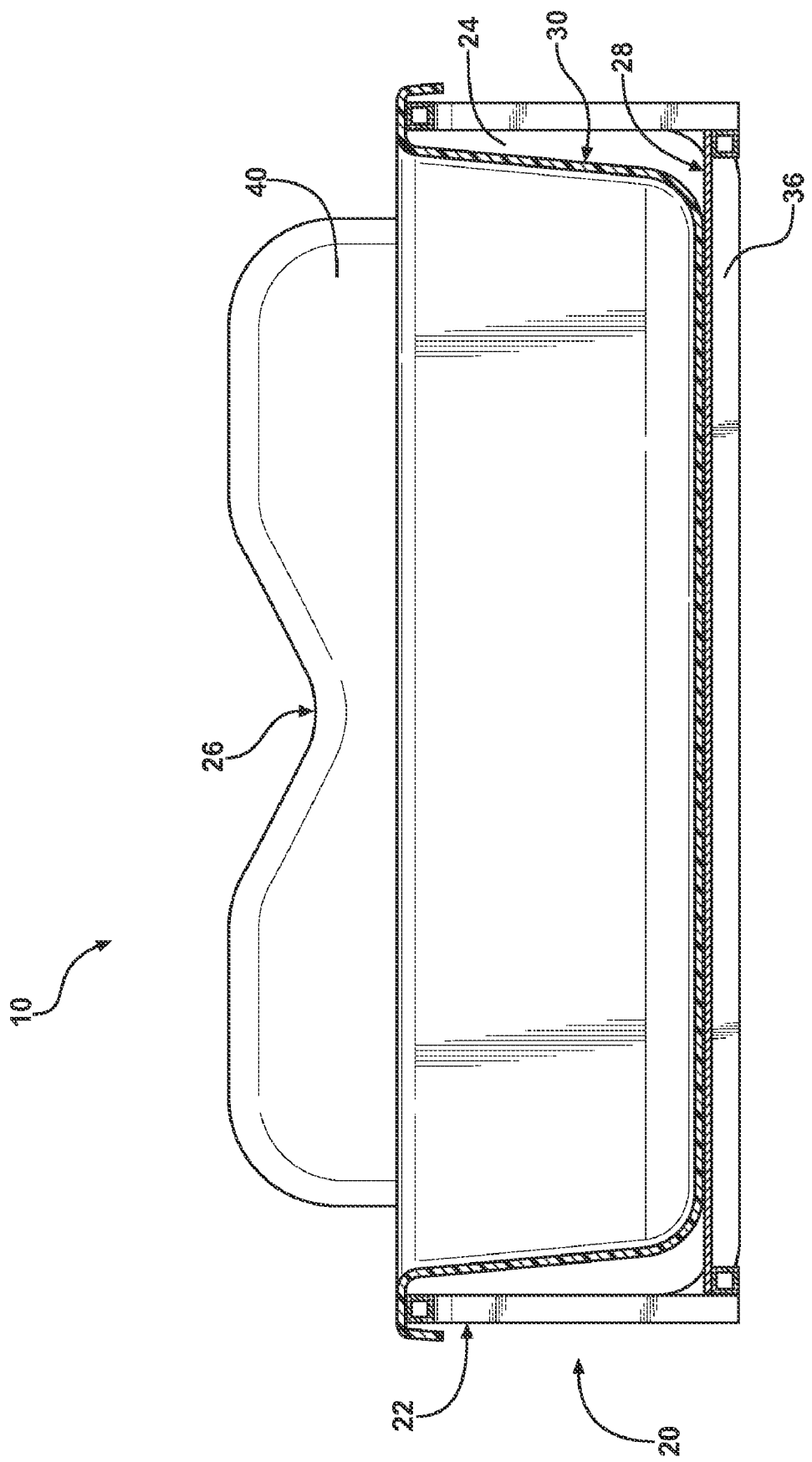
FIG. 7 is a sectional front view of the seat/flatbed/drop-in-container assembly for a cart of the invention showing the container supported upon the flatbed and support members positively engaging the container to secure the container to the framework upon the flatbed.

Now with reference particularly to FIGS. 1 and 4, the cart 12 defines, among other things not necessarily relevant to employment of the assembly 10 with the cart 12, a rear portion, generally indicated at 14. The cart 12 also includes a body, generally indicated at 16, and a bumper, generally indicated at 17, of the rear portion 14. As shown in FIG. 4, the cart 12 defines also an open cargo-carrying compartment, generally indicated at 18, of the rear portion 14 of the cart 12. It should be appreciated by those having ordinary skill in the related art that the cart 12, in general, and the rear portion 14, body 16, bumper 17, and compartment 18 of the cart 12, in particular, can have any suitable shape, size, and structure and structural relationship with the assembly 10. It should be so appreciated also that the rear portion 14, body 16, bumper 17, and compartment 18 of the cart 12 can have any suitable structural relationship with each other. It should be so appreciated also that the cart 12 forms no part of the assembly 10.

With reference particularly to FIGS. 1 through 4, the assembly 10 comprises, in general, a framework, generally indicated at 20, that extends from and is supported by the cart 12, includes at least one support member, generally indicated at 22, and defines a volume of space 24 interiorly of the support member 22 and a remaining portion of the framework 20. A seat, generally indicated at 26, is supported by the framework 20 within the volume of space 24 and adapted to extend to define a flatbed, generally indicated at 28, supported by the framework 20 within the volume of space 24. A container, generally indicated at 30, is adapted to be dropped-in the volume of space 24 and supported upon the flatbed 28. The support member 22 positively engages the container 30 to secure the container 30 to the framework 20 upon the flatbed 28.

More specifically, in an embodiment of the assembly 10 and as shown in the figures, the framework 20 extends substantially immediately above and about the compartment 18 and rearwardly beyond a rear of the compartment 18. To this end, the only structure that may need to be removed from the cart 12 to employ the assembly 10 with the cart 12 is a rack designed to hold a pair of golf bags and a basket designed to hold golfing-related objects, like golf-club-head covers and wearing apparel. The rack is located generally above a substantially central portion of the compartment 18, and the basket is located generally between the rack and a rear face of a seat back of a front seat of the cart 12. Otherwise, installation of the assembly 10 upon the cart 12 requires no more removal of structure of the cart 12. That is to say, the seat back of the front seat and a roof, just to name a couple of structures, can remain as features of the cart 12.

In the embodiment of the assembly 10 shown in the figures, the framework 20 consists of bar- or rod-like pieces that are attached to each other and/or the body 16 of the rear portion 14 of the cart 12. Each piece defines linear and arcuate portions of the piece. More specifically, the framework 20 includes a frame member 32 that defines a substantially U-shaped horizontal cross-section and substantially outlines the compartment 18 such that the open end of the frame member 32 is disposed opposite the seat 26. The frame member 32 is bolted to the body 16 of the rear portion 14 of the cart 12, and the plane defined by the frame member 32 is substantially parallel with a top surface of the body 16. The length of the frame member 32 that lies rearwardly beyond the rear of the compartment 18 is less than the length of the frame member 32 that lies about the compartment 18.

In the embodiment shown, the framework 20 includes a plurality of support members 22. In particular, each of a pair of opposed, identical support members 22 defines a substantially U-shaped vertical cross-section and extends upright from a corresponding side of the frame member 32 (the paired support members 22). The open end of each of these support members 22 spans approximately the width of the compartment 18. In this way, these support members 22 can act as respective outside arm rests for the seat 26. These support members 22 also are bolted to the frame member 32, and the respective planes defined by these support members 22 are disposed substantially parallel with other. These support members 22 are also integrally connected to each other by a connection member 34 that extends juxtaposed to and substantially parallel and flush with the closed end of the frame member 32.

Another support member 22 extends upright slightly beyond a substantially central portion of the open end of the frame member 32 (the unpaired support member). The top of this support member 22 is positioned slightly higher than the top of the other support members 22. The plane defined by this support member 22 is disposed substantially perpendicular to the respective planes defined by the other support members 22, and the respective planes defined by all of the support members 22 are disposed substantially perpendicular to the plane defined by the frame member 32.

A crossbar 36 extends from and completely between opposite sides of the frame member 32 substantially directly above the bumper 17 of the cart 12 and just interior to the sides of the corresponding support members 22 located opposite the connection member 34. The length of the crossbar 36 is disposed substantially perpendicular to the length of the sides of the frame member 32 and the length of the sides of the corresponding support members 22. The crossbar 36 is adapted to support the side of the seat 26 located opposite the connection member 34 to support the seat 26 above the compartment 18. Furthermore, an opposed, identical pair of non-linear structural members 38 depend substantially straight from the ends of the crossbar 36 (or from the respective portions of the frame member 32 located adjacent the crossbar 36) to the bumper 17 of the cart 12. The length of each structural member 38 is disposed substantially perpendicular to the length of the crossbar 36. The structural members 38 support the frame member 32 above the compartment 18 and otherwise provide overall structural integrity to the framework 20, in particular, and assembly 10, in general.

It should be appreciated by those having ordinary skill in the related art that the framework 20, in general, and each of the support members 22, frame member 32, connection member 34, crossbar 36, and structural members 38, in particular, can have any suitable shape, size, and structure and structural relationship with the cart 12. It should be so appreciated also that the support members 22, frame member 32, connection member 34, crossbar 36, and structural members 38 can have any suitable relationship with each other. It should be so appreciated also that the framework 20 can include any suitable number of support members 22 and structural members 38. It should be so appreciated also that the framework 20, in general, and frame member 32, connection member 34, and structural members 38, in particular, can be attached to the cart 12 in any suitable manner. It should be so appreciated also that the support members 22, crossbar 36, and structural members 38 can be attached to the frame member 32 or any other part of the assembly 10 or cart 12 in any suitable manner. It should be so appreciated also that the framework 20, in general, and each of the support members 22, frame member 32, connection member 34, crossbar 36, and structural members 38, in particular, can be made of any suitable material.

Also as shown in the figures, the seat 26 is adapted to seat at least a couple of passengers of the cart 12 other than that or those seated with the driver in the front seat of the cart 12. To this end, the seat 26 includes a cushion and a cushioned seat back 40. The seat back 40 is supported by a pair of identical, opposed posts that are spaced with respect to each other and extend upward from the body 16 of the rear portion 14 of the cart 12 (on the opposite side of the connection member 34 as the frame member 32). In this way, space is defined between the cushion and seat back 40 and a portion of the seat back 40 rises above the adjacent support members 22. The seat 26 is designed to fold-over such that it resembles a fold-over couch, whereby folding-over of the seat 26 creates the flatbed 28.

The seat 26 is substantially planar, defines a substantially rectangular horizontal cross-section of the seat 26, and extends from and completely between opposite sides of the frame member 32 substantially directly and immediately above the compartment 18. The side of the seat 26 located opposite the seat back 40 is supported upon and disposed substantially flush with the crossbar 36, and the remainder of the seat 26 runs toward the seat back 40 substantially flush with the frame member 32 completely or nearly to the closed end of the frame member 32. In this way, the ends of the seat 26 are disposed directly below much (if not most), but not all, of the corresponding support members 22. The length of the seat 26 is disposed substantially perpendicular to the length of the sides of the frame member 32 and the length of the sides of the corresponding support members 22.

It should be appreciated by those having ordinary skill in the related art that the seat 26, in general, and each of the cushion and seat back 40, in particular, can have any suitable shape, size, and structure and structural relationship with the framework 20 or cart 12. It should be so appreciated also that the space defined between the cushion and seat back 40 can have any suitable shape and size and relationship with the cushion and seat back 40. It should be so appreciated also that the seat 26, in general, and each of the cushion and seat back 40, in particular, can be attached to the framework 20 or cart 12 in any suitable manner. It should be so appreciated also that the seat 26 may not include the cushion and/or seat back 40.

Also as shown in the figures, the assembly 10 comprises further a platform 42 extending rearwardly from the compartment 18, supported by the framework 20, and adapted to support feet of respective users of the seat 26. More precisely, the platform 42 defines a substantially rectangular horizontal cross-section and extends rearwardly directly from and symmetrically with respect to the bumper 17 (or the structural members 38 that are attached to the bumper 17) such that a floor of the compartment 18, bumper 17, and platform 42 form in combination with each other a substantially planar surface. The width of the platform 42 is less than that of the compartment 18, and the length of the platform 42 is slightly greater than that of the compartment 18 (although the ends of the bumper 17 are unobstructed such that they are still functional for the intended purpose of the bumper 17). A rear portion of each side of the open end of the frame member 32 curls downward slightly beyond the platform 42 and then curls back toward the cart 12 (such that this portion defines a substantially U-shaped vertical cross-section). The bottom side of this portion is bolted to a corresponding side of the platform 42, whereby the platform 42 is supported above the surface upon which the cart 12 is positioned. The unpaired support member 22 extends slightly outward from (to slightly beyond the frame member 32) and is supported by a substantially central portion of the side of the platform 42 positioned opposite the cart 12 before the support member 22 extends upward.

The assembly 10 comprises further a structural support 44 extending from a substantially central portion of the side of the platform 42 positioned proximate the cart 12 to a substantially central portion of the other support member 22. The structural support 44 is a substantially linear rod and adapted to support the flatbed 28 above the platform 42. The seat 26 is adapted to fold-over onto the "curly" portions of the frame member 42 substantially directly above the platform 42 such that the flatbed 28 is disposed substantially directly above the compartment 18 and platform 42. The flatbed 28 covers approximately the entire area defined by the interior of the top of the frame member 32 and is substantially flush with the frame member 32.

It should be appreciated by those having ordinary skill in the related art that the flatbed 28, platform 42, and structural support 44 can have any suitable shape, size, and structure and structural relationship with each other, the framework 20 (especially the frame member 32 and unpaired support member 22), or the cart 12. It should be so appreciated also that the flatbed 28, platform 42, and structural support 44 can be attached to each other, the framework 20 (especially the frame member 32 and unpaired support member 22), or the cart 12 in any suitable manner.

Also as shown in the figures, the container 30 defines a substantially rectangular horizontal cross-section of the container 30. The container 30 defines also a body, generally indicated at 46, and a rim, generally indicated at 48, defining the entire perimeter of the top of the container 30. The rim, in turn, 48 defines a lip 52 disposed substantially completely about the rim 48 and an aperture 50 disposed completely through the rim 48 at a substantially central portion of a long side of the container 30. The top portion of the unpaired support member 22 is adapted to extend through the aperture 50, and the top portion of each of the paired support members 22 is adapted to be interferingly fitted between the body 46 and lip 52 along at least a majority of a corresponding short side of the container 30 to secure the container 30 to the framework 20 upon the flatbed 28. More specifically, the top portion of the unpaired support member 22 extends completely through the aperture 50 such that the support member 22 is disposed only slightly above the rim 48 to secure the container 30 to the framework 20 upon the flatbed 28. As shown, the length and width of the aperture 50 is substantially equal to the greatest length and width, respectively, of the top portion of the unpaired support member 22 such that the unpaired support member 22 is adapted to be interferingly fitted within the aperture 50 and to the rim 48. Therefore, the container 30 substantially operatively cannot be displaced with respect to the flatbed 28.

The seat back 40 positively engages the container 30 to secure the container 30 upon the flatbed 28. More specifically, the container 30 defines also a flange 54 that is adapted to fit into the space defined between the cushion and seat back 40 and hold the bottom portion of the seat back 40 to secure the container 30 upon the flatbed 28. The flange 54 extends along at least a majority of the long side of the container 30 disposed opposite the aperture 50. In combination with each other, the support members 22 and seat back 40 operatively at least partially enclose the container 30. The container 30 can be open or include a lid and be closed by the lid.

Because the unpaired support member 22 extends through the aperture 50 of the container 30, the container 30 is substantially not allowed to operatively move transversely (namely, toward either far side of the cart 12, toward the front or rear end of the cart 12, or upward) or rotationally with respect to the flatbed 28. And, because each of the paired support members 22 is interferingly fitted between the body 46 and lip 52 along at least a majority of a corresponding short side of the container 30, the container 30 is substantially not allowed to operatively move transversely (namely, toward either far side of the cart 12, toward the front or rear end of the cart 12, or upward) or rotationally with respect to the flatbed 28. And, because the flange 54 fits into the space defined between the cushion and seat back 40 and holds the bottom portion of the seat back 40, the container 30 is substantially not allowed to operatively move transversely (namely, toward either far side of the cart 12, toward the front or rear end of the cart 12, or upward) or rotationally with respect to the flatbed 28. And, of course, the flatbed 28 prevents the container 30 from operatively moving downward. Accordingly, the container 30 is substantially not allowed to operatively move in any direction and, thus, is satisfactorily secured to the cart 12.

And, because the support member 22 is disposed only slightly above the rim 48 to secure the container 30 to the framework 20 upon the flatbed 28, the assembly 10 does not substantially limit the shape and size of cargo that the assembly 10 can carry and transport in the container 30. More specifically, because the top of each of the unpaired and paired support members 22 is not positioned any higher above the plane defined by the rim 48 of the container 30 than is reasonably necessary (for purposes of securement of the container 30 to the framework 20), that part or those parts of the cargo that is/are positioned above the container 30 is/are not boxed-in by the support members 22. In this way, the assembly 10 can still carry and transport in the container 30 cargo a part or parts of which is/are positioned above the container 30 and is/are wider and/or longer than the container 30.

It should be appreciated by those having ordinary skill in the related art that the container 30, in general, and body 46, rim 48, lip 52, and flange 54 of the container 30, in particular, can have any suitable shape, size, and structure and structural relationship with the remainder of the assembly 10. It should be so appreciated also that the body 46, rim 48, lip 52, and flange 54 of the container 30 can have any suitable structural relationship with each other. It should be so appreciated also that the aperture 50 can have any suitable shape and size and relationship with the remainder of the container 30. It should be so appreciated also that the container 30 can be secured upon the flatbed 28 in any suitable manner.

In operation, when it is desired to satisfactorily carry and transport more people and cargo than the cart 12 otherwise would do so, the aftermarket assembly 10 is relatively easily and quickly assembled to the cart 12 such that the assembly 10 adds the seat 26, flatbed 28, and container 30 to the cart 12. More specifically, when it is desired to use the assembly 10 to transport, say, passengers of the cart 12, only the seat 26 is easily and quickly actuated. (In this case, the container 30 is removed from the assembly 10.) Alternatively, when it is desired to use the assembly 10 to transport, say, oversized cargo that does not necessarily need to be contained within the container 30, the seat 26 is easily and quickly folded-over such that only the flatbed 28 is actuated, and the cargo is loaded upon the flatbed 28. (In this case, the container 30 is removed from the assembly 10.) In this regard, the assembly 10 allows for relatively easy and quick transition between the seat 26 and flatbed 28. Alternatively, when it is desired to use the assembly 10 to transport, say, non-oversized cargo that necessarily needs to be contained within the container 30, the seat 26 is easily and quickly folded-over such that the flatbed 28 is actuated, the container 30 is easily and quickly secured atop the flatbed 28, and the cargo is loaded into the container 30. In this regard, the assembly 10 allows for relatively easy and quick transition between the flatbed 28 and container 30.

The assembly 10 is an aftermarket assembly that adds the seat 26, flatbed 28, and container 30 to the cart 12 such that the cart 12 satisfactorily carries and transports more people and cargo than the cart 12 otherwise would do so. Also, the container 30 is satisfactorily secured to the cart 12. And, the container 30 is substantially not allowed to operatively move in any direction. More specifically, the container 30 is substantially not allowed to operatively move transversely (namely, toward either far side of the cart 12, toward the front or rear end of the cart 12, or upward) or rotationally with respect to the flatbed 28. Furthermore, the assembly 10 does not substantially limit the shape and size of cargo that the assembly 10 can carry and transport in the container 30. More specifically, the assembly 10 can carry and transport in the container 30 cargo a part or parts of which is/are positioned above the container 30 and is/are wider and/or longer than the container 30. In addition, the assembly 10 can be specifically designed to be employed with a particular type of cart 12. More specifically, the assembly 10 provides the drop-in container 30, which can be used with a seat kit—such as a two-in-one fold-down (the seat 26 folded down into the flatbed 28)—for a particular type of golf cart 12. Moreover, the assembly 10 allows for relatively easy and quick transition between the seat 26 and flatbed 28 and between the flatbed 28 and container 30. Plus, installation of the assembly 10 upon the cart 12 requires no or minimal removal or modification of structure of the cart 12. The assembly 10 can be installed upon the cart 12 relatively easily and quickly as well.

The assembly 10 has been described in an illustrative manner. It is to be understood that the terminology that has been used is intended to be in the nature of words of description rather than of limitation. Many modifications and variations of the assembly 10 are possible in light of the above teachings. Therefore, within the scope of the appended claims, the assembly 10 may be practiced other than as specifically described.

What is claimed is:

1. A seat-and-flatbed-and-drop-in-container assembly for a cart comprising:
    a framework extending from and supported by the cart, including at least one support member, and defining a volume of space interiorly of said support member and a remaining portion of said framework;
    a seat supported by said framework within said volume of space and adapted to extend to define a flatbed supported by said framework within said volume of space; and
    a container adapted to be dropped-in said volume of space and supported upon said flatbed and defining an aperture disposed completely through said container, wherein said support member extends through said aperture to secure said container to said framework upon said flatbed.

2. Said seat-and-flatbed-and-drop-in-container assembly for the cart as set forth in claim 1, wherein the cart defines an open cargo-carrying compartment of a rear portion of the cart and:
    said seat is disposed substantially directly and immediately above said compartment;
    said assembly comprises further a platform extending rearwardly from said compartment, supported by said framework, and adapted to support feet of respective users of said seat; and
    said seat is adapted to extend substantially directly above said platform such that said flatbed is disposed substantially directly above said compartment and platform.

3. Said seat-and-flatbed-and-drop-in-container assembly for the cart as set forth in claim 2, wherein said assembly comprises further a structural support extending from said platform to said framework and adapted to support said flatbed above said platform.

4. A cart comprising:
    a seat-and-flatbed-and-drop-in-container assembly, said assembly including:
        a framework extending from and supported by a remaining portion of said cart, including at least one support member, and defining a volume of space interiorly of said support member and a remaining portion of said framework;
        a seat supported by said framework within said volume of space and adapted to extend to define a flatbed supported by said framework within said volume of space; and
        a container adapted to be dropped-in said volume of space and supported upon said flatbed and defining an aperture disposed completely through said container, wherein said support member extends through said aperture to secure said container to said framework upon said flatbed.

5. Said cart as set forth in claim 4, wherein:
    said cart defines an open cargo-carrying compartment of a rear portion of said cart;
    said seat is disposed substantially directly and immediately above said compartment;
    said assembly includes further a platform extending rearwardly from said compartment, supported by said framework, and adapted to support feet of respective users of said seat; and
    said seat is adapted to extend substantially directly above said platform such that said flatbed is disposed substantially directly above said compartment and platform.

6. Said cart as set forth in claim 4, wherein said assembly includes further a structural support extending from said platform to said framework and adapted to support said flatbed above said platform.

7. A seat-and-flatbed-and-drop-in-container assembly for a cart comprising:
    a framework extending from and supported by the cart, including at least one support member, and defining a volume of space interiorly of said support member and a remaining portion of said framework;
    a seat supported by said framework within said volume of space and adapted to extend to define a flatbed supported by said framework within said volume of space; and
    a container adapted to be dropped-in said volume of space and supported upon said flatbed and defining a body and a rim of said container, wherein said rim defines a lip of said rim and said support member is interferingly fitted between said body and lip to secure said container to said framework upon said flatbed.

8. Said seat-and-flatbed-and-drop-in-container assembly for the cart as set forth in claim 7, wherein said at least one support member of said framework includes a plurality of support members, said container defines an aperture disposed completely through said container, at least one of said support members extends through said aperture, and at least another of said support members is interferingly fitted between said body and lip to secure said container to said framework upon said flatbed.

9. Said seat-and-flatbed-and-drop-in-container assembly for the cart as set forth in claim 7, wherein the cart defines an open cargo-carrying compartment of a rear portion of the cart and:
   said seat is disposed substantially directly and immediately above said compartment;
   said assembly comprises further a platform extending rearwardly from said compartment, supported by said framework, and adapted to support feet of respective users of said seat; and
   said seat is adapted to extend substantially directly above said platform such that said flatbed is disposed substantially directly above said compartment and platform.

10. Said seat-and-flatbed-and-drop-in-container assembly for the cart as set forth in claim 9, wherein said assembly comprises further a structural support extending from said platform to said framework and adapted to support said flatbed above said platform.

11. A cart comprising:
   a seat-and-flatbed-and-drop-in-container assembly, said assembly including:
      a framework extending from and supported by a remaining portion of said cart, including at least one support member, and defining a volume of space interiorly of said support member and a remaining portion of said framework;
      a seat supported by said framework within said volume of space and adapted to extend to define a flatbed supported by said framework within said volume of space; and
      a container adapted to be dropped-in said volume of space and supported upon said flatbed and defining a body and a rim of said container, wherein said rim defines a lip of said rim and said support member is interferingly fitted between said body and lip to secure said container to said framework upon said flatbed.

12. Said cart as set forth in claim 11, wherein said at least one support member of said framework includes a plurality of support members, said container defines an aperture disposed completely through said container, at least one of said support members extends through said aperture, and at least another of said support members is interferingly fitted between said body and lip to secure said container to said framework upon said flatbed.

13. Said cart as set forth in claim 11, wherein:
   said cart defines an open cargo-carrying compartment of a rear portion of said cart;
   said seat is disposed substantially directly and immediately above said compartment;
   said assembly includes further a platform extending rearwardly from said compartment, supported by said framework, and adapted to support feet of respective users of said seat; and
   said seat is adapted to extend substantially directly above said platform such that said flatbed is disposed substantially directly above said compartment and platform.

14. Said cart as set forth in claim 13, wherein said assembly includes further a structural support extending from said platform to said framework and adapted to support said flatbed above said platform.

15. A seat-and-flatbed-and-drop-in-container assembly for a cart comprising:
   a framework extending from and supported by the cart, including at least one support member, and defining a volume of space interiorly of said support member and a remaining portion of said framework;
   a seat supported by said framework within said volume of space and adapted to extend to define a flatbed supported by said framework within said volume of space; and
   a container adapted to be dropped-in said volume of space and supported upon said flatbed, wherein said seat includes a seat back and the container defines a flange that holds the seat back to secure the container upon the flatbed.

16. Said seat-and-flatbed-and-drop-in-container assembly for the cart as set forth in claim 15, wherein the cart defines an open cargo-carrying compartment of a rear portion of the cart and:
   said seat is disposed substantially directly and immediately above said compartment;
   said assembly comprises further a platform extending rearwardly from said compartment, supported by said framework, and adapted to support feet of respective users of said seat; and
   said seat is adapted to extend substantially directly above said platform such that said flatbed is disposed substantially directly above said compartment and platform.

17. Said seat-and-flatbed-and-drop-in-container assembly for the cart as set forth in claim 16, wherein said assembly comprises further a structural support extending from said platform to said framework and adapted to support said flatbed above said platform.

18. A cart comprising:
   a seat-and-flatbed-and-drop-in-container assembly, said assembly including:
      a framework extending from and supported by a remaining portion of said cart, including at least one support member, and defining a volume of space interiorly of said support member and a remaining portion of said framework;
      a seat supported by said framework within said volume of space and adapted to extend to define a flatbed supported by said framework within said volume of space; and
      a container adapted to be dropped-in said volume of space and supported upon said flatbed, wherein said seat includes a seat back and the container defines a flange that holds the seat back to secure the container upon the flatbed.

19. Said cart as set forth in claim 18, wherein:
   said cart defines an open cargo-carrying compartment of a rear portion of said cart;
   said seat is disposed substantially directly and immediately above said compartment;
   said assembly includes further a platform extending rearwardly from said compartment, supported by said framework, and adapted to support feet of respective users of said seat; and
   said seat is adapted to extend substantially directly above said platform such that said flatbed is disposed substantially directly above said compartment and platform.

20. Said cart as set forth in claim 19, wherein said assembly includes further a structural support extending from said platform to said framework and adapted to support said flatbed above said platform.

* * * * *